United States Patent
Berg et al.

[11] Patent Number: 6,096,383
[45] Date of Patent: Aug. 1, 2000

[54] CURING OF FLOOR COATINGS USING LONG AND SHORT WAVE ULTRAVIOLET RADIATION

[75] Inventors: David W. Berg, Plymouth; Bruce F. Field, Golden Valley; Norman William Gill, Plymouth; Joseph S. Keute, Blaine; Deone E. Johnson, Edina; Earl Oscar Frederick Krueger, Jr., Eagan, all of Minn.

[73] Assignee: Tennant Company, Minneapolis, Minn.

[21] Appl. No.: 09/300,921

[22] Filed: Apr. 28, 1999

[51] Int. Cl.[7] ................ C08F 2/48; C08F 2/44; B32B 31/28; B32B 35/00
[52] U.S. Cl. .............. 427/493; 427/514; 427/140; 427/512; 427/508
[58] Field of Search ................ 427/493, 495, 427/508, 512, 514, 140, 136

[56] References Cited

U.S. PATENT DOCUMENTS

| | | | |
|---|---|---|---|
| 3,898,349 | 8/1975 | Kehr et al. | 427/520 |
| 3,930,064 | 12/1975 | Sander . | |
| 3,935,364 | 1/1976 | Proksch et al. | 427/520 |
| 3,975,554 | 8/1976 | Kummins et al. | 427/515 |
| 4,122,225 | 10/1978 | Holmstrom et al. . | |
| 4,163,082 | 7/1979 | Romenesko | 427/515 |
| 4,287,228 | 9/1981 | Schlesinger . | |
| 4,289,798 | 9/1981 | Bagley et al. | 427/493 |
| 4,308,118 | 12/1981 | Dudgeon . | |
| 4,339,566 | 7/1982 | Rosenkranz et al. | 427/510 |
| 4,411,931 | 10/1983 | Duong | 427/493 |
| 4,421,784 | 12/1983 | Troue | 427/493 |
| 4,478,876 | 10/1984 | Chung . | |
| 4,479,726 | 10/1984 | Gupta et al. . | |
| 4,568,558 | 2/1986 | Angrick et al. . | |
| 4,597,987 | 7/1986 | Hockemeyer et al. . | |
| 4,656,053 | 4/1987 | Angrick et al. . | |
| 4,920,254 | 4/1990 | DeCamp et al. . | |
| 4,999,216 | 3/1991 | Gaske et al. | 427/519 |
| 5,141,990 | 8/1992 | McKoy et al. . | |
| 5,425,970 | 6/1995 | Lahrmann et al. . | |
| 5,534,310 | 7/1996 | Rokowski et al. | 427/494 |
| 5,536,758 | 7/1996 | Boldt . | |
| 5,667,227 | 9/1997 | Boldt . | |
| 5,712,022 | 1/1998 | Tanaka et al. . | |
| 5,716,551 | 2/1998 | Unruh et al. . | |

*Primary Examiner*—Marianne Padgett
*Attorney, Agent, or Firm*—McEachran, Jambor, Keating, Bock & Kurtz

[57] ABSTRACT

A process for applying a coating to a floor surface and curing that coating after application includes the steps of first spreading a photochemically curable liquid coating in a thickness of from about 0.003 to about 0.006 inches on a floor surface. After the coating has been applied, it is exposed to ultraviolet radiation at a power level of about 40 watts per inch of width of coating being cured and at two different sequentially applied wavelengths. This cures the liquid coating instantly to a durable solid coating. The first applied ultraviolet radiation may have the wavelength of about 365 nm and the second applied ultraviolet radiation may have a wavelength of about 254 nm. The ultraviolet radiation is provided by an array of UV lights on a mobile, self-powered vehicle which moves over the floor coating at a speed in the range of 20 to 40 feet per minute.

18 Claims, 1 Drawing Sheet

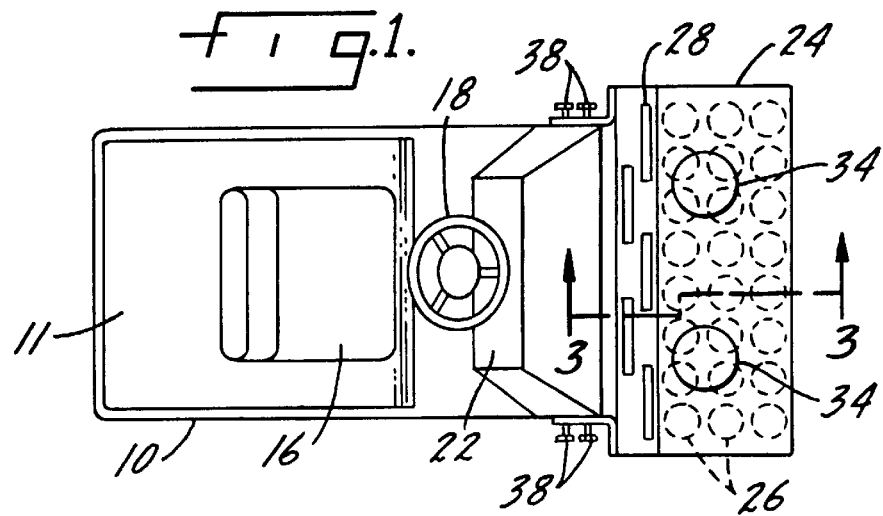
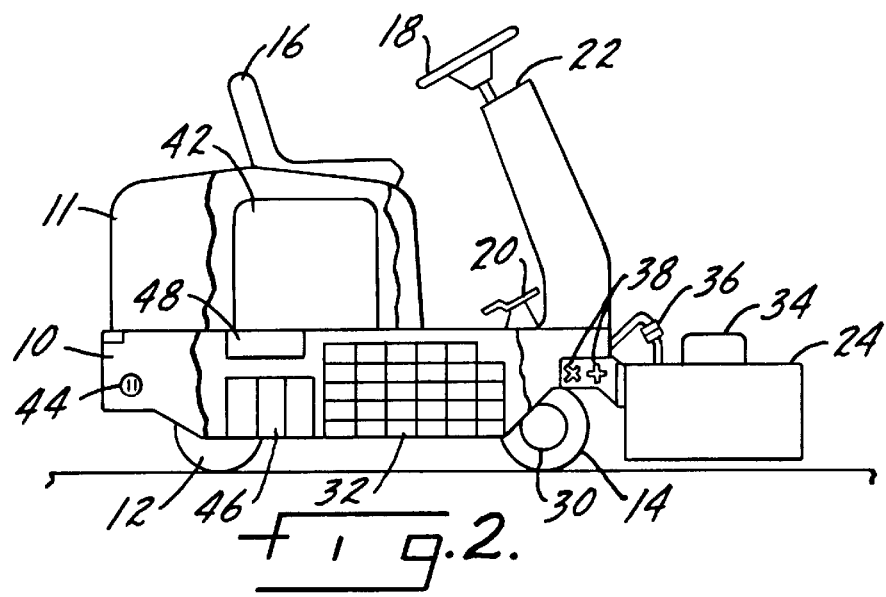
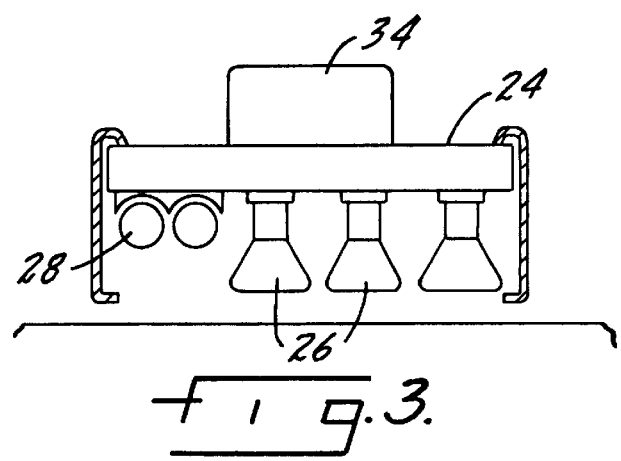

CURING OF FLOOR COATINGS USING LONG AND SHORT WAVE ULTRAVIOLET RADIATION

THE FIELD OF THE INVENTION

The present invention relates to the use of ultraviolet radiation to cure a floor coating. It is known in the art that ultraviolet radiation (UV) can be used to cure such coatings as inks, adhesives and the like and that such can be cured in seconds or fractions of a second under particular types of UV light. In general, the use of UV radiation for curing coatings can greatly reduce time and cost for providing an acceptable exterior coating on a product. No mixing of the coating is required. There are lower operating costs when compared to conventional thermal curing. The product is instantly dry and no solvents are required. UV cure resin systems have been formulated in, for example, but not limited to, epoxy, polyester and polyurethane acrylates.

Floor coatings protect floors from dirt, wear, spillage and hazardous chemicals. Coatings also make floors easy to clean, reflect light to brighten an area, and make the floor more attractive. But cure times for conventional coatings can be quite lengthy, from hours to days, before traffic can be allowed onto a newly coated floor, so an instantaneous coating cure such as by UV would be very advantageous. However, current efforts to cure floor coatings with UV using a single wavelength are so power consuming that they have not been widely accepted.

SUMMARY OF THE INVENTION

The present invention relates to a liquid floor coating which is reactive to two specific wavelengths of UV radiation and which is cured to a hard and durable solid state in a few seconds by a mobile self-powered source of UV radiation that travels over the coating and exposes it to the two specific UV wavelengths to which it reacts. The longer wavelength is applied first for deep curing, followed immediately by the shorter wavelength for surface curing, and the total curing is essentially instantaneous. The coating also contains conventional curing agents that react to visible light or atmospheric humidity, so that coated areas missed by the mobile source of UV radiation will eventually cure. Optional additives are provided for the coating to reduce static discharge, add color, or increase durability.

The principal purpose of the invention is to provide a UV reactive floor coating which, after being spread on the floor, is cured to its solid state almost instantly by a mobile source of UV radiation, the power requirements for which are so low that it is practical to power it with an on-board source of electrical energy, or a 120-volt 20-ampere wall outlet and a power cord, while curing a relatively wide strip of the coating.

Other purposes will appear in the ensuing specification, drawings and claims.

BRIEF DESCRIPTION OF THE DRAWINGS

The invention is illustrated in the following drawings wherein:

FIG. 1 is a top view of a typical machine which may be used to cure a liquid floor coating;

FIG. 2 is a side view of the machine of FIG. 1 with portions broken away and some parts shown schematically; and FIG. 3 is an enlarged section taken on line 3—3 of FIG. 1 illustrating the machine components which provide the ultraviolet radiation for curing the floor coating.

DESCRIPTION OF THE PREFERRED EMBODIMENT

The present invention provides a process for curing floor coatings, commonly on concrete floors, but also on many other types of floors, such as ceramic tile, wood or vinyl. It may be used to fill cracks in floors or for repair. The process utilizes, as the preferred coating, a urethane based copolymer, although any substance that will polymerize under UV radiation is a candidate. Readily available examples include epoxy, polyester or urethane acrylates. Preferably the coating is applied in a thickness of from about 0.003 to about 0.006 inches. The liquid coating may be applied to the floor in a conventional manner, as with a roller, after which it is cured to a durable solid state by radiation from a mobile source of UV radiation passing over it. Specifically, a coating of the type set forth above is reactive to and is cured by a first ultraviolet light application at a wavelength of 365 nanometers (nm). This provides what is known as a deep curing, which cures that portion of the coating closest to the floor surface and sets the adhesive characteristic of the coating in adhering to the floor. Directly after the application of UV radiation at 365 nm, and in the same pass of the mobile UV light source, ultraviolet radiation at 254 nm is applied. This provides surface curing and fully cures the coating. Other wavelengths are possible, provided the reactivity of the coating is matched to those wavelengths.

Typically, prior art UV cured floor coatings have been cured using only one wavelength of UV radiation, and have required high power. For example, the lamps provided for some curing applications using one wavelength of UV operate at approximately 440 volts with a power use of approximately 600 watts per inch of width of cured coating. This is power excessive. The present application uses 120 volts, and for a 40-inch wide path the total power consumption is approximately 1600 watts, or 40 watts per inch of width of cured coating.

This power consumption is so much lower than that used by the prior art that it is practical to run the new equipment either from a 120-volt 20-ampere wall outlet or from an on-board generator set. A UV curing machine made according to the present invention fully cured a 40-inch wide strip of UV curable coating that was 0.003–0.005 inch thick on a concrete floor at a travel speed of 4 inches per second. It used an on-board 80-pound generator set comprised of a 5 horsepower gasoline engine driving a 2.5 KW, 120 volt AC generator. Power draw from the generator was measured to be 1600 watts. The radiant output of the UV lamps was measured as 0.012 joule per square centimeter on the floor coating. More recent experiments indicate that travel speed up to 8 inches per second is probably feasible. This economy of power use is the outstanding advantage of this invention.

Before applying a floor coating, the floor should be prepared for that coating. This preparation will vary with the type of floor and its age. One very common situation occurs where a concrete floor has been previously coated and that coating has deteriorated with use to where it needs to be replaced. The deteriorated coating must be removed prior to recoating for satisfactory results. Traditionally, this has been done by softening the old coating with a solvent stripper and manually scraping it off, a time and labor intensive, environmentally objectionable method. The process used by the assignee of the present invention, Tennant Company, and provided under the trademark Eco-Prep is faster, uses less labor and is environmentally clean. It uses a sanding machine described in U.S. Pat. No. 4,768,311 to remove the old coating and leave the floor smooth. Following that, some jobs require that the floor be scrubbed to remove loose dust, and acid-etched to promote adhesion of the new coating. If these operations are needed, a scrubbing machine with a good vacuum pickup squeegee will do them quickly and leave the floor damp dry so that it will fully air dry in a few minutes. If desired, this drying can be hastened by directing fans at the floor or even by using a portable heater to blow warm air on the floor. With this procedure, and then by using the UV curable floor coating material and UV curing equipment described herein, it is possible and practical to remove worn coatings from a concrete floor, scrub, etch and dry it, and apply a new coating and fully cure it so the newly coated floor is ready to support heavy traffic, all within a few hours. For example, the work can be completed overnight. It can be started after a work shift ends at 5:00 P.M. and be ready for traffic before 8:00 A.M. the next morning when people arrive to go to work, so there is no down time for floor renewal. This rapid process is made possible mainly by two factors: first, the time saved in removing the old coating by the Eco-Prep process, and second, the instantaneous UV cure of the new coating, which eliminates several days of drying time required by non-UV cure coatings. The economic benefits of an accelerated floor renewal program are substantial.

One of the unique aspects of using ultraviolet radiation at 254 nm is that this specific radiation provides germicidal protection to the exposed area. Thus, not only does the UV radiation assist in curing the coating, but it also provides an antibacterial or antimicrobial treatment to the floor surface.

The specific floor coating which was utilized under the present application is one which may be generically described as a urethane based copolymer. More specifically, the preferred coating is one provided by Norland Products, Inc. of New Brunswick, N.J., and designated as SW3. Another product which has been used successfully is made by Summers Optical of Fort Washington, Pa., and sold under the designation VTC-2. These products are reactive to 365 nm and 254 nm UV light and cure to a hard, durable floor coating. In addition, at least the Norland coating includes conventional curing agents which cure by air oxidation and/or exposure to visible light and/or atmospheric humidity so that any areas missed by the UV curing equipment, or floor cracks too deep to cure to the bottom, will also cure at a slower rate and not remain tacky indefinitely.

Various additives may be optionally used in the coating for specific purposes. For example, in many applications, particularly industrial, it is desired to provide protection against static electricity. To do this, indium tin oxide may be added to the coating. It doesn't interfere with the curing process, or affect the color of the coating, but makes the coating electrically conductive and so eliminates static electricity.

A second class of additive consists of colorants. These are available in various colors, do not interfere with the UV curing, and may be utilized in either powder or liquid form.

An additional additive may be in the form of high wear abrasive grit to add a certain texture to the coating, provide non-slip characteristics and substantially increase the durability and usable wear life of the coating. Various materials might be used for this purpose, for example, silicon carbide. But, crystallized aluminum oxide is a preferred material because not only is it excellent for increasing durability or wear resistance, but in addition, it has the useful property of creating an observable difference in appearance between the cured and uncured coating. This aids an operator steering the curing machine to see what is cured and what is not, because the coating material without this additive looks the same on the floor whether it is cured or uncured.

The equipment for curing the coating is a mobile machine designed to travel on the floor being coated, and may be a walk-behind machine or one on which the operator rides. The latter is perhaps the preferred configuration, and is shown in the attached drawings. It will be described using dimensions of a machine of a particular size, but there is nothing to prevent scaling these dimensions up or down to obtain a machine to cure a wider or narrower strip of coating. Such variations are considered to be within the purview of this invention.

As shown, the machine has a frame 10, a body 11, and is supported by two free-rolling rear wheels 12 and one steerable, driving front wheel 14. There is a seat 16 for the operator, a steering wheel 18 and a foot pedal 20 for controlling forward, neutral or reverse travel and travel speed. An instrument panel 22 holds several instruments and control switches, not shown. One of these switches selects the mode of operation; either transport or cure. In transport mode the foot pedal 20 selects neutral, variable forward speed to 5 MPH and variable reverse speed to 3 MPH. In cure mode the forward speed is a constant 4 inches per second or 20 feet per minute. Recent experiments indicate that this speed can probably be increased to at least 40 feet per minute.

Attached to the front of the machine is a cure head 24 which has an effective curing width of 40 inches. It contains twenty-four round medium pressure mercury flood lamps 26 in three rows of 8 and five 9-inch long tubular medium pressure mercury flood lamps 28 in two staggered rows, so in effect they form one continuous row of tubular lamps. These lamps are all ballast driven, and each lamp has its own ballast, so there are twenty-nine ballasts 32 located in the body of the machine. They run cool enough that no special cooling is required. Two fans 34, each rated at 50 CFM, are sufficient to cool the UV lamps.

The cure head 24 is bolted to the frame 10 of the machine at a working height such that the lower surface of the lamps 26 and 28 are 1½ inches above the floor being coated. The cure head is removed after each use by removing the attaching bolts, which are provided with hand knobs 38 to facilitate no-tool removal and attachment. The electric wires feeding the lamps and fans in the cure head are bound into one electrical cable which has a coupling 36 that can be readily pulled apart when removing the cure head from the machine. It is good practice to remove the cure head after each job and store it in a fitted box for shipment to the next job. Fewer broken lamps that way. The walls of the cure head come down to 1¼ inches above the floor to protect the lamps and contain all direct UV light. Indirect reflected light is insignificant, so there is no risk to the eyes of the operator or bystanders.

The UV lamps can be obtained from Cole-Parmer Instrument Company of Vernon Hills, Ill. The round flood lamps 26 are catalog no. P-09819-25, and emit UV light on a wavelength of 365 nm. The 9-inch long tubular lamps are catalog no. P-97606-08 and emit UV light on a wavelength of 254 nm. Cole-Parmer can also recommend suitable ballasts 32 for these lamps. The ballasts operate on 120 volts AC input.

In laboratory tests, the power input to a ballast supplying one of the round 365 nm flood lamps was 60 watts, while the power to a ballast supplying one of the tubular 254 nm lamps was 15 watts. Thus, the twenty-four 365 nm flood lights drew 1440 watts and the five 254 nm tubular lamps together drew 75 watts, for a total of 1515 watts to all of the lamps, with approximately 95% of the power going to the 365 nm lamps and approximately 5% going to the 254 nm lamps. Additional power consumed by the cooling fans and traction drive brought the total power consumption of the machine to 1600 watts, or 13.3 amperes at 120 volts.

This power is supplied by an on-board engine-generator set 42. It is Honda model EB2500X, with a 2.5 KW 120-volt AC generator powered by a 5-horsepower gasoline engine equipped with a catalytic converter for emissions control. Alternatively, the engine can be equipped to burn propane.

On the machine frame 10 there is a plug-in port 44 for connecting a power cord from a 120-volt 20-ampere wall outlet as an alternative source of power if for some reason the generator set can't be used. The outer side of port 44 accepts a 120-volt power cord and is connected to its inner side, which accepts a multiple terminal cable. There is one on-board cable plugged into the generator which feeds all the electrical requirements of the machine. It can be unplugged from the generator and plugged into the inner side of plug-in port 44. Power to the machine can then flow through a power cord from a wall outlet.

The traction drive 30 in the front wheel 14 operates on 36 volts DC. It is supplied by three 12-volt motorcycle batteries 46 in series. A 10-ampere battery charger 48 with a 120-volt AC input and a 36-volt DC output draws current from the generator (or alternative wall outlet) and keeps the batteries charged.

Whereas the preferred form of the invention has been shown and described herein, it should be realized that many modifications, substitutions and alterations thereto may be possible.

The embodiments of the invention in which an exclusive property or privilege are claimed are defined as follows:

1. A process for applying a protective and/or decorative coating to a floor surface under ambient air conditions, including the steps of:

spreading a liquid coating on a floor surface under ambient air conditions, said liquid coating being photochemically completely curable in response to the application of only two different wavelengths of ultraviolet radiation, thereafter, under ambient air conditions, moving a source of ultraviolet radiation which provides the two different ultraviolet wavelengths across the floor being coated, so that the liquid floor coating is sequentially exposed first to a longer wavelength ultraviolet radiation, whereby a subsurface portion of the coating is cured as the ultraviolet radiation source passes over the floor surface and second to a shorter wavelength ultraviolet radiation for surface cure of the coating.

2. The process of claim 1 wherein said first wavelength is approximately 365 namometers and said second wavelength is approximately 254 nanometers.

3. The process of claim 1 wherein the coating has a thickness in a range of 0.003 to 0.006 inches.

4. The process of claim 1 wherein the source of ultraviolet radiation is moved relative to the floor surface being coated at a rate which is in a range of four to eight inches per second.

5. The process of claim 1 wherein the floor coating is cured in a path that is approximately forty inches wide.

6. The process of claim 1 wherein electrical power needed to operate the ultraviolet radiation source is provided by an electrical power source which is be self-contained and moves with the ultraviolet radiation source.

7. The process of claim 1 wherein electrical power needed to operate the source of ultraviolet radiation is on the order of 40 watts per inch of width of the floor coating being cured.

8. The process of claim 1 wherein electrical power is needed to operate the source of ultraviolet radiation, with approximately 95% of that electrical power being used to produce the longer wavelength radiation while approximately 5% is used to produce the shorter wavelength radiation.

9. The process of claim 1 wherein said floor coating includes an electrically conductive additive.

10. The process of claim 9 wherein said electrically conductive additive includes indium tin oxide.

11. The process of claim 1 wherein said floor coating includes a colorant in liquid and/or powder form.

12. The process of claim 1 wherein said floor coating includes an abrasive grit.

13. The process of claim 1 whereby said floor coating includes an additive which causes appearance of the coating on the floor to be observably different after it is cured than before it is cured.

14. The process of claim 13 wherein the additive includes crystallized aluminum oxide.

15. The process of claim 14 wherein the crystallized aluminum oxide also serves as an abrasive grit.

16. The process of claim 1 wherein at least one of said wavelengths of ultraviolet radiation possesses germicidal or antimicrobial capability, so that the coated floor is given a sanitizing treatment while the coating is being cured.

17. The process of claim 1 wherein electrical power needed to operate the ultraviolet radiation source is provided by an electrical power source which is a 120-volt AC wall outlet and a power cord.

18. The process of claim 1 including an initial step of removing a worn coating with a sanding machine.

\* \* \* \* \*